US012591217B2

(12) United States Patent
Hildebrandt et al.

(10) Patent No.: US 12,591,217 B2
(45) Date of Patent: Mar. 31, 2026

(54) METHOD AND SYSTEM FOR PROVIDING RECOMMENDATIONS CONCERNING A CONFIGURATION PROCESS

(71) Applicant: Siemens Aktiengesellschaft, Munich (DE)

(72) Inventors: Marcel Hildebrandt, Munich (DE); Serghei Mogoreanu, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 348 days.

(21) Appl. No.: 18/025,706

(22) PCT Filed: Sep. 2, 2021

(86) PCT No.: PCT/EP2021/074246
§ 371 (c)(1),
(2) Date: Mar. 10, 2023

(87) PCT Pub. No.: WO2022/063542
PCT Pub. Date: Mar. 31, 2022

(65) Prior Publication Data
US 2023/0359173 A1 Nov. 9, 2023

(30) Foreign Application Priority Data
Sep. 23, 2020 (DE) .................................. 20197648.7

(51) Int. Cl.
*G05B 19/4155* (2006.01)
(52) U.S. Cl.
CPC ................... *G05B 19/4155* (2013.01); *G05B 2219/31334* (2013.01)

(58) Field of Classification Search
None
See application file for complete search history.

(56) References Cited

U.S. PATENT DOCUMENTS

| | | | |
|---|---|---|---|
| 2009/0259987 A1 | 10/2009 | Bergman et al. | |
| 2015/0363543 A1 | 12/2015 | Mansouri et al. | |
| 2019/0005384 A1* | 1/2019 | Sundar ................... | G06N 3/084 |

FOREIGN PATENT DOCUMENTS

| | | | | |
|---|---|---|---|---|
| CN | 106650922 A | * | 5/2017 | ............ G06N 3/063 |
| EP | 3173983 A1 | | 5/2017 | |

OTHER PUBLICATIONS

Ying, "Graph Convolutional Neural Networks for Web-Scale Recommender Systems", Jun. 2018, Cornell Univ, pp. 1-10 (Year: 2018).*

(Continued)

*Primary Examiner* — David Earl Ogg
(74) *Attorney, Agent, or Firm* — Schmeiser, Olsen & Watts, LLP

(57) ABSTRACT

A computer-implemented method for providing recommendations, REC, concerning a configuration process is provided to configure an industrial system, SYS, the method including the steps of calculating by a trained graph neural network, GNN, scores, s, for components, c, of a set, C, of configurable component types, ct; generating recommendations, REC, for introducing at least one additional component, c, into the industrial system, SYS, on the basis of the calculated scores, s; and outputting the generated recommendations, REC, to a user by a user interface or executing the generated recommendations.

14 Claims, 3 Drawing Sheets

(56) References Cited

OTHER PUBLICATIONS

Zhang, "DSSLP: A Distributed Framework for Semi-supervised Link Prediction", 2019, IEEE, pp. 1-8 (Year: 2019).*

Hildebrandt, Marcel et al.; "A Recommender System for Complex Real-World Applications with Nonlinear Dependencies and Knowledge Graph Context"; European Semantic Web Conference, ESWC 2019; 16th International Conference, ESWC 2019, Portoroz, Slovenia, Jun. 2-6, 2019; Springer International Publishing, Cham; vol. 11503; Chap. 12; No. 558; pp. 179-193; XP047514176; DOI: 10.1007/978-3-030-21348-0 12; ISBN: 9783030213480; 2019.

Hildebrandt, Marcel et al.; "Reasoning on Knowledge Graphs with Debate Dynamics"; arxiv.org; Cornell University Library; XP081570721; 2020.

Hildebrandt, Marcel et al.; "Configuration of Industrial Automation Solutions Using Multi-relational Recommender Systems : European Conference, ECML PKDD 2018, Dublin, Ireland, Sep. 10-14, 2018, Proceedings, Part III"; in: "Advances in Databases and Information Systems"; Springer International Publishing Cham 032682; XP055591284; ISBN: 978-3-319-10403- 4; vol. 11053; pp. 271-287; DOI: 10.1007/978-3-030-10997-4_17; 2018.

Rex, Ying et al.; "Graph Convolutional Neural Networks for Web-Scale Recommender Systems"; arxiv.org; Cornell University Library; XP080887551; DOI: 10.1145/3219819.3219890; 2018.

PCT International Search Report and Written Opinion of the International Search Authority mailed Dec. 13, 2021 corresponding to PCT International Application No. PCT/EP2021/074246 filed Sep. 2, 2021.

* cited by examiner

METHOD AND SYSTEM FOR PROVIDING RECOMMENDATIONS CONCERNING A CONFIGURATION PROCESS

CROSS-REFERENCE TO RELATED APPLICATIONS

This application claims priority to PCT Application No. PCT/EP2021/074246, having a filing date of Sep. 2, 2021, which claims priority to EP Application No. 20197648.7, having a filing date of Sep. 23, 2020, the entire contents all of which are hereby incorporated by reference.

FIELD OF TECHNOLOGY

The following relates to a computer-implemented method and recommendation engine for providing recommendations concerning a configuration process to configure an industrial system.

BACKGROUND

An industrial system can comprise a plurality of different kinds of components, in particular automation components. These automation components can comprise hardware and software components.

The process of configuring an industrial system in engineering projects involves several major steps. The appropriate components have to be selected by a user such that their interplay fulfills all functional requirements arising from the intended use case. To do this, an engineer in charge of configuring the industrial system typically utilizes configuration software containing a catalog of available automation components. A totally integrated automation portal can provide access to a wide range of digitalized automation services ranging from digital planning and integrated engineering to a transparent operation. Each automation component can comprise a set of technical features or attributes that have an impact on their capabilities and their compatibility with other automation components. The technical features can comprise both static technical features and configurable technical attributes. For an engineering of the industrial system, the selected components have to be coupled so that the connectivity pattern allows the intended real-world application. As a consequence, it is not possible to represent an engineering solution for an industrial system in the form of a flat list but involve an inherent topology. Finally, in a conventional configuring process, the values of the configurable technical attributes of the selected automation components are chosen by the user such that the components are compatible and the whole subsystem can operate in the intended scenarios.

Conventional systems may implement predefined recommendation rules such as "if A then B". Further, an implicit recommendation of a next component to be added to the industrial system may be provided by sorting of a corresponding list of possible options, i.e., all available components and/or all available components belonging to a certain category. This can be done either based on some manually defined artificial criteria or by employing one of the collaborative filtering-based techniques. Collaborative filtering-based techniques can be augmented by additional contextual information or information about a sequence in which items or components are added to the already existing partially configured industrial system. However, none of the conventional recommendation systems are capable of providing information how to connect the configured components with each other.

SUMMARY

An aspect relates to a method and an apparatus for increasing the efficiency of a configuration process used to configure an industrial system.

Embodiments of the invention provide according to the first aspect a computer-implemented method for providing recommendations concerning a configuration process to configure an industrial system wherein the method comprises the steps of:

calculating by a trained graph neural network scores for components of a set of configurable component types, generating recommendations for introducing at least one additional component into the industrial system on the basis of the calculated scores, outputting the generated recommendations to a user by a user interface or executing the generated recommendations.

Further on, the graph neural network is trained to encode component features and a topology of the industrial system configured by the configuration process. The component features can comprise both static features and configurable attributes of the respective component.

In a further possible embodiment of the computer-implemented method according to the first aspect of the present invention, the topology of the industrial system is represented by a topology graph stored in a memory, wherein a vertex set of the topology graph contains vertices representing configured components of the industrial system and wherein an edge set of the topology graph contains edges between two vertices representing connections between two corresponding components within the industrial system configured by the configuration process.

In a further possible embodiment of the computer-implemented method according to the first aspect of the present invention, each vertex within the vertex set of the topology graph of the industrial system representing a corresponding component in the industrial system comprises an associated feature vector specifying technical attributes of the respective component.

In a further possible embodiment of the computer-implemented method according to the first aspect of the present invention, each feature vector of a vertex within the vertex set of the stored topology graph of the industrial system comprises a one-hot encoding of a component type of the respective component.

In a further possible embodiment of the computer-implemented method according to the first aspect of the present invention, the feature vectors of all vertices of the vertex set of the stored topology graph of the industrial system form a feature matrix stored in the memory.

In a still further possible embodiment of the computer-implemented method according to the first aspect of the present invention, an embedding for each configured component of the industrial system is performed by processing the feature vector of the corresponding vertex within the vertex set of the stored topology graph of the industrial system along with the feature vectors of all neighboring vertices in the stored topology graph by the trained graph neural network to generate a context-aware embedding with an embedding size of the respective component.

In a further possible embodiment of the computer-implemented method according to the first aspect of the present invention, the embedding is performed for all configured components of the industrial system to generate a first embedding matrix, $H \in \mathbb{R}^{n \times d}$, wherein n is the number of vertices v in the vertex set V of the stored topology graph G and d is the embedding size.

In a further possible embodiment of the computer-implemented method according to the first aspect of the present invention, embedding is performed for all component types of components to generate a second embedding matrix Z with $Z \in \mathbb{R}^{m \times d}$, wherein m is the number of configurable component types and d is the embedding size.

In a further possible embodiment of the computer-implemented method according to the first aspect of the present invention, a matrix multiplication of the second embedding matrix Z with the transposed first embedding matrix $H^T$ is performed to calculate a score matrix S with $S \in \mathbb{R}^{m \times n}$, wherein each entry $s_{ij}$ of the calculated score matrix S contains a score s which indicates a plausibility of selecting a component c of the component type $ct_i$ and connecting it to an already configured component c of the component type $ct_j$.

In a further possible embodiment of the computer-implemented method according to the first aspect of the present invention, recommendations for introducing at least one additional component c into the industrial system are generated for the component types having the highest scores s in the calculated score matrix S.

In a further possible embodiment of the computer-implemented method according to the first aspect of the present invention, in response to an introduction of an additional component c into the industrial system by a user via the user interface, the stored topology graph of the industrial system is automatically extended with an additional vertex corresponding to the introduced component c and extended with an edge between the additional vertex v and the vertex of the at least one component c to which the additional component c has been connected to.

In a further possible embodiment of the computer-implemented method according to the first aspect of the present invention, the feature vector $x_v$ of the vertex v corresponding to the additional component c is initialized with a one-hot encoding of the component type ct of the additional component c and the remaining entries of the feature vector $x_v$ are set to zero.

In a further possible embodiment of the computer-implemented method according to the first aspect of the present invention, the initialized feature vector $x_v$ of the vertex v corresponding to the additional component c is passed through the trained graph neural network GNN to produce for the respective added component c an embedding vector $h_{n+1}$, which is fed into a prediction model g to generate a prediction vector $\hat{x}_{n+1}$ having entries output to the user via the user interface as recommendations for the technical attributes of the respective added component c.

Embodiments of the invention provide according to a further aspect a recommendation engine for providing recommendations concerning a configuration process to configure an industrial system, wherein the recommendation engine is adapted to calculate by a trained graph neural network GNN scores s for components c of a set C of configurable component types ct and to generate recommendations for introducing at least one additional component c into the industrial system on the basis of the calculated scores s, wherein the generated recommendations are output to a user by a user interface or executed automatically, and wherein the graph neural network, GNN, is trained to encode component features and a topology of the industrial system configured by the configuration process, wherein the component features comprise static features and configurable attributes a of the respective component, c.

BRIEF DESCRIPTION

DETAILED DESCRIPTION

Figure 1:
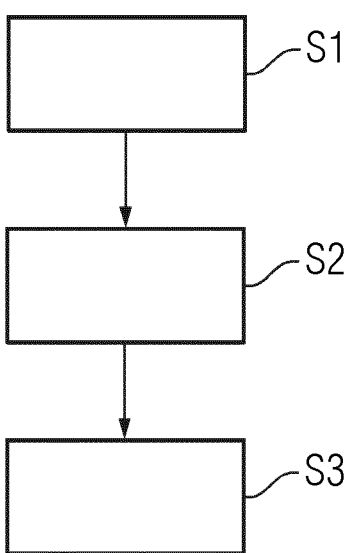
FIG. 1 shows a flowchart of a possible exemplary embodiment of a computer-implemented method according to the first aspect of the present invention.

As can be seen from the flowchart in FIG. 1, the computer-implemented method for providing recommendations concerning a configuration process to configure an industrial system SYS can comprise in a possible embodiment several main steps.

The computer-implemented method according to embodiments of the present invention can be used to provide assistance in the process of configuring engineering projects concerning an industrial system SYS. The computer-implemented method can provide recommendations concerning the configuration process of the industrial system using a trained graph neural network GNN. Graph neural networks GNNs are connectionist models that capture the dependence of graphs via a message passing between nodes of graphs. Unlike a standard neural network, graph neural networks can retain a state that can represent information from its neighborhood with arbitrary depths.

In the computer-implemented method according to the first aspect of embodiments of the present invention as illustrated by the flowchart of FIG. 1, in a first step S1, scores s for components c of a set C of configurable component types are calculated by a trained graph neural network GNN.

In a further step S2, recommendations for introducing at least one additional component c into the industrial system SYS are generated on the basis of the calculated scores s.

Finally, in a third step S3, the generated recommendations are either output to a user by a user interface or automatically executed.

The graph neural network GNN used to calculate the scores s in step S1 has been trained to encode component features and a topology of the industrial system SYS configured during the configuration process. The component features can comprise static features and configurable technical attributes of the respective component c. The static features or attributes of an automation component c are invariable and do not change over time. These static features may for instance comprise a size, height or volume of the respective automation component c. Another example of static features may also comprise for instance the number of ports provided by the respective automation component. A further example for a static feature of an automation component c is the applied line voltage or supply voltage for the respective automation component c. Besides the static features, the component c can comprise configurable technical attributes such as a temperature range where the automation component c can be used in the industrial system SYS or whether the respective automation component c has to be fail-safe or not.

The topology of the respective industrial system SYS to be configured during the configuration process can be represented by a topology graph $G=(V, E)$ and can be stored in a memory of a recommendation engine. The vertex set V of the topology graph G contains vertices v representing configured components c of the industrial system SYS. Further, an edge set E of the topology graph G contains edges between two vertices $v_i$, $v_j$ representing connections between two corresponding components $c_i$, $c_j$ within the industrial system SYS to be expanded during the configuration process.

Each vertex v within the vertex set V of the topology graph G of the industrial system SYS representing a corresponding component c in the industrial system SYS comprises an associated feature vector $x_v$. A feature vector $x_v$ of a vertex v specifies technical attributes of the respective automation component c. These technical attributes can comprise both static features and also configurable technical attributes of the respective automation component c. Each feature vector $x_v$ of a vertex v within the vertex set V of the stored topology graph G of the industrial system SYS can comprise a one-hot encoding of a component type ct of the respective automation component c. In a possible embodiment, the feature vectors $x_v$ of all vertices v of the vertex set V of the stored topology graph G of the industrial system SYS form a feature matrix X stored in the memory of the recommendation engine.

An embedding for each configured component c of the industrial system SYS is performed by processing the feature vector $x_v$ of the corresponding vertex v within the vertex set V of the stored topology graph G of the industrial system SYS along with the feature vectors $x_v$ of all neighboring vertices v in the stored topology graph G by the trained graph neural network GNN to generate a context-aware embedding $h_v$ with an embedding size d of the respective component c. The neighboring vertices v can comprise directly neighboring vertices v within the graph but also vertices v connected indirectly via several hops in the topology graph G. The graph neural network GNN is trained to encode both the component features and the topology of the respective engineering project. A partial, i.e., not completed engineering project, is represented by the topology graph $G=(V, E)$. Each component c has an associated feature vector $x_v$ that specifies the configured technical attributes.

The embedding is performed for all configured components c in the industrial system SYS to generate a first embedding matrix $H \in \mathbb{R}^{n \times d}$, wherein n is the number of vertices v in the vertex set V of the stored topology graph G and d is the embedding size.

The embedding is performed for all component types ct of components c to generate a second embedding matrix Z with $Z \in \mathbb{R}^{m \times d}$, wherein m is the number of configurable component types ct and d is the embedding size. To allow efficient computation on the node level, a so-called embedding is produced for every configured component c represented by a corresponding vertex v in the vertex set V. For this purpose, the trained graphical neural network GNN is employed. The trained graphical neural network GNN takes as an input the feature vector $x_v$ of a given center node or vertex v within the graph along with all the feature vectors $x_v$ of its neighboring vertices v to produce a context-ware embedding $h_v$. Heuristically speaking, a forward pass through the graphical neural network GNN first aggregates the feature vectors $x_v$ of all the automation components c which are connected with the vertex v of the center node. Then, in a second step, the graphical neural network GNN combines this neighborhood information with the feature vector $x_v$ to produce an embedding $h_v$. It is possible to stack multiple layers of the graphical neural network GNN to obtain a more expressive encoder. The computations can be redone or reiterated for every node or vertex v to form the first embedding matrix H.

Since it is a goal to produce a score s for all component types c of the component type set C, d-dimensional embeddings for all component types ct are generated. This can be achieved by reusing components of the graphical neural network GNN or via an embedding look-up. In most cases, the resulting embedding matrix is denoted with $Z \in \mathbb{R}^{m \times d}$, wherein m is the number of configurable component types ct and d is the embedding size.

In a further step, a matrix multiplication of the second embedding matrix Z with the transposed first embedding matrix $H^T$ is performed to calculate a score matrix S with $S \in \mathbb{R}^{m \times n}$, wherein each entry $s_{ij}$ of the calculated score matrix S contains a score s which indicates a plausibility or suitability of selecting a component c of the component type $ct_i$ and connecting it to an already configured component c of the component type $ct_j$. Accordingly, a score s is produced for every item when performing a matrix multiplication $S=Z \cdot H^T$ corresponding to a linear decoding step. Hence, if properly calibrated, an entry $S_{ij}$ of $S \in \mathbb{R}^{m \times n}$ contains scores s that indicate the plausibility of selecting a component type $ct_i$ and connecting it to the already configured component c of the component type $ct_j$. On that basis, it is possible to generate recommendations to a user to add components c to the already partially configured industrial system SYS that come with the highest scores s.

The user may now proceed in different ways. The user may add the recommended automation component c to the already existing partially configured industrial system SYS or may also add another not recommended component c to the industrial system SYS. In a further option, the user may decide not to add any further component c and finalize the engineering project.

In case that the user adds the recommended component c or another not recommended component, this corresponds to adding a new vertex $v_{n+a}$ to the topology graph G and connecting it to an existing node or vertex $v_j$. In this case, the graph G is extended with the new vertex and edge and the process is reiterated. Otherwise, if the user does not add any further component the configuration process can be terminated.

In response to an introduction of an additional component c into the industrial system by a user via the user interface, the stored topology graph G of the industrial system SYS can be automatically extended with the additional vertex v corresponding to the introduced component c and extended with an edge between the additional vertex v and the vertex of the component c to which the additional component c has been connected to. The feature vector $x_v$ of the vertex v corresponding to the additional component c can be initialized with a one-hot encoding of the component type ct of the additional component c and the remaining entries of the feature vector $x_v$ are set to zero. In a possible embodiment, the initialized feature vector $x_v$ of the vertex v corresponding to the additional component c can be passed through the trained graph neural network GNN to produce for the respective added component c an embedding $h_{n+1}$ which can be fed into a prediction model g to generate a prediction vector $\hat{x}_{n+1}$ having entries output to the user via the user interface as recommendations for the technical attributes of the respective added component c.

Figure 2:
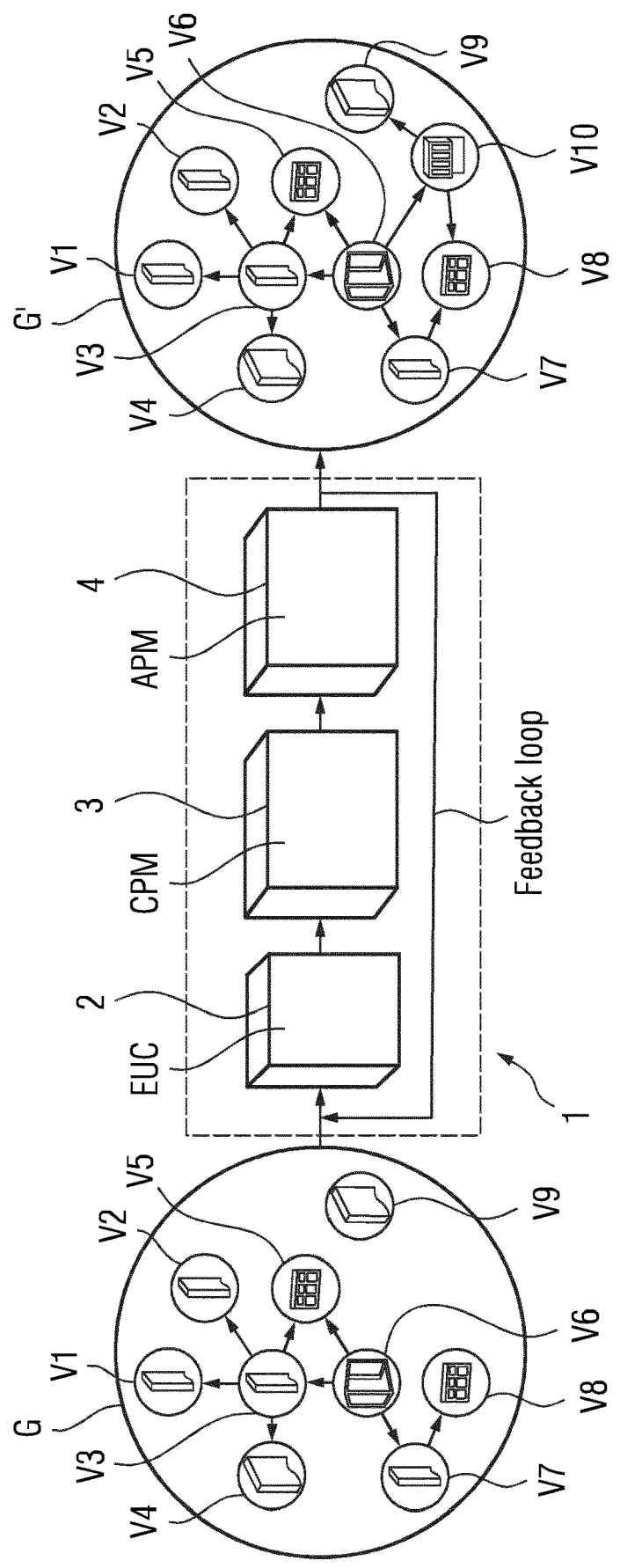
FIG. 2 shows a diagram for illustrating a possible exemplary embodiment of a recommendation engine according to a further aspect of the present invention.

FIG. 2 shows a diagram for illustrating a possible embodiment of a recommendation engine 1 according to a further aspect of the embodiments of the present invention. The recommendation engine 1 illustrated in FIG. 2 comprises in the illustrated embodiment three main modules. The recommendation engine 1 receives via an input interface an input partially configured engineering project represented by the topology graph G having vertices v connected by edges. Each vertex v or node of the graph G represents a configured component c of the respective industrial system SYS. These automation components c can comprise both hardware and software components. These automation components c can for instance comprise programmable logic controllers PLC, human-machine interfaces HMI, motion controllers, server amplifiers, variable speed drivers or robotic components. Depending on the use case, there can be a wide variety of different hardware or software components that can be configured and used during a configuration process of an industrial system SYS. In the illustrated example of FIG. 2, the graph G of the partially configured engineering process comprises nine vertices $v_1$ to $v_9$ each representing a corresponding component c of a specific component type ct. As illustrated in FIG. 2, the vertices $v_1$, $v_2$, $v_3$, $v_7$ represent components c of a first component type ct. Also, the vertices $v_4$, $v_9$ are of the same component type ct. Further, the components c represented by the vertices $v_5$, $v_8$ are of the same component type ct. The vertex $v_6$ represents a component c of a further component type ct. The vertices v are connected via edges of an edge set E representing connections between two corresponding components within the industrial system SYS.

The recommendation engine 1 can be used to provide recommendations concerning a configuration process to configure and to expand the respective industrial system SYS. The recommendation engine 1 as shown in FIG. 2 is adapted to calculate by a trained graph neural network GNN scores s for components c of a set C of configurable component types ct and to generate automatically recommendations introducing at least one additional component c into the industrial system SYS on the basis of the calculated scores s. The generated recommendations can be either output to a user by a user interface or executed automatically by an execution engine of the system.

In the illustrated example, the recommendation engine 1 recommends adding an additional component c represented by the vertex $v_{10}$ of the graph G' into the partially configured industrial system SYS represented by the graph G supplied to the recommendation engine 1. $v_{10}$ represents a component c which is connected to the components c represented by the vertices $v_6$, $v_8$, $v_9$. The recommendation engine 1 according to embodiments of the present invention does not only give a recommendation what kind of component c has to be added to the partially configured industrial system SYS but also to which other components c it shall be connected to. Further, the recommendation engine 1 does also provide information about the configurable attributes of the added automation component c. In the example illustrated in FIG. 2, the configurable attributes of the added component c comprise as a maximum temperature of the added component c a temperature value of 60. Further, it indicates that the added component c shall be fail-safe. In the illustrated embodiment of FIG. 2, the recommendation engine 1 comprises three main modules including an encoder module 2, a link prediction module 3 and an attribute prediction module 4.

The encoder module 2 comprises a trained graph neural network GNN which can calculate scores s for components c of a set C of configurable component types ct. Based on the calculated scores s, recommendations for introducing at least one additional component into the industrial system are generated. The link prediction module 3 is used to predict links or edges indicating to which components c the added component c shall be connected to. The attribute prediction module 4 can use a prediction model g to generate a prediction vector having entries output to the user via a user interface as recommendations for the technical attributes of the respective added component c such as fail-safe=true and x maximum operation temperature=60.

Figure 3:
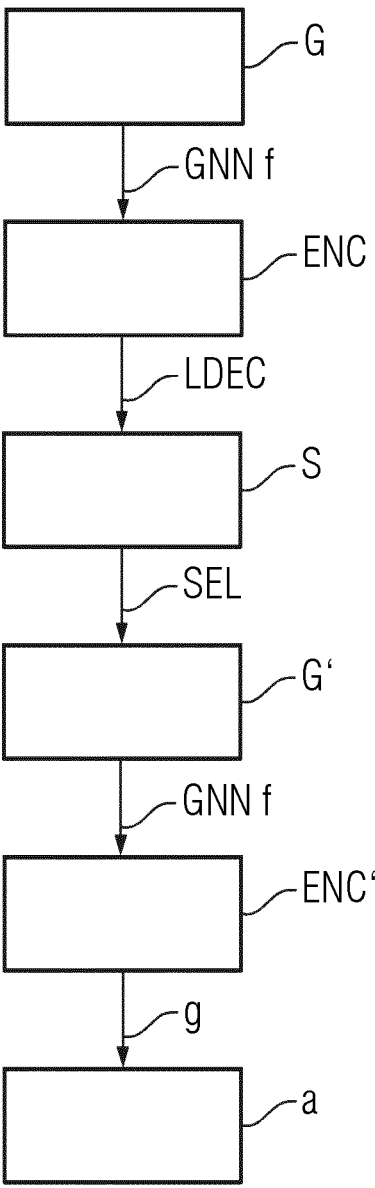
FIG. 3 shows further flowcharts for illustrating a computer-implemented method according to the first aspect of embodiments of the present invention.

FIG. 3 shows a further diagram for illustrating the computer-implemented method according to embodiments of the present invention. As illustrated in FIG. 3, the partially configured engineering project represented by graph G is supplied to a trained graph neural network GNN performing an encoding ENC. The linear decoder DEC performs a matrix multiplication of the second embedding matrix Z with the transposed first embedding matrix $H^T$ to calculate a score matrix S wherein each entry $S_{ij}$ of the calculated score matrix S contains a score s which indicate a plausibility of selecting a component c of the component type $ct_i$ and connecting it to an already configured component c of the component type $ct_j$. Then, in the illustrated example, a user may perform a component selection SFL to expand the already existing partial engineering project wherein the expanded engineering project or industrial system SYS can be illustrated by a graph G' as shown also in the example of FIG. 2. The expanded engineering project or industrial system SYS illustrated by the expanded graph G' can then be processed again by the trained graph neural network GNN to provide an encoding ENCI of the system including the new added component c. This can be supplied to a prediction model g to predict configurable technical attributes a or features of the respective component c.

The graph neural network GNN can be trained from historical engineering projects. The training data T can consist of historical engineering projects that were configured in the past. That means that $T=\{(G_1, X_1), (G_2, X_2), \ldots, (G_T, X_T)\}$ wherein each G corresponds to a network representation of an engineering project and $X_i$ to a feature matrix. Heuristically speaking, one first deletes parts of structures in $(G_i, X_i)$ and then aims to recover these structures by the recommendation system according to embodiments of the present invention. Thereby, it is possible to obtain an approximation of partially configured engineering projects. Then, the system SYS is trained and validated by its ability to complete the projects as they were previously configured before the deletion step. More concretely, it is possible to train the parameters of the graph neural network GNN to recommend previously deleted items in the vertex set V leading to a loss $L_R$. Moreover, it is possible to train the graph neural network GNN and the prediction model g with regard to the abilities to restore the feature matrix X, leading to a prediction loss $L_P$. In a possible embodiment, a joint loss $L=L_R L_P$ can be formed such that the whole model can be trained end-to-end.

With the computer-implemented method according to embodiments of the present invention, it is possible to exploit historical examples of industrial engineering projects to not only provide details on where to connect a selected component c but also to predict values of technical attributes of the respective component c. The computer-implemented method and engine is more scalable than conventional systems relying on manually defined rules. In addition, depending on the complexity of the underlying technical systems, the computer-implemented method according to embodiments of the present invention allows to discover more complex or obscure patterns to base recommendations on than those that a domain expert in charge of maintaining the collection of rules could easily specify. Compared to existing data-driven methods, the computer-implemented method according to embodiments of the present invention is capable of providing details on how the automation components c shall be connected with each other as well as the values of configurable technical attributes of the respective automation components. This is possible by using a trained graph neural network GNN and a prediction model g. The computer-implemented method according to embodiments of the present invention can be integrated in a configuration software tool to increase the efficiency of a configuration process of a complex industrial system SYS. The computer-implemented method can be performed by a recommendation assistance system. In a possible embodiment, the recommendation engine 1 can operate in real time while a user is in the process of configuring an engineering project or industrial system SYS. Depending on the particularities of the use case, quality and amount of training data, the proposed computer-implemented method can be used either to assist the user in the process of configuring an industrial engineering system SYS or to complete automatically the configuration procedure. The computer-implemented method according to embodiments of the present invention does not only provide for a component selection and topology construction, i.e., how the automation components c are connected, but also provides for a selection of values of configurable technical attributes of an added component c such as whether the added component c shall be fail-safe or a value concerning a maximal admissible operation temperature for the respective added component c.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for providing recommendations REC concerning a configuration process to configure an industrial system SYS, the method comprising:

calculating by a trained graph neural network GNN, scores s for components c of a set C of configurable component types ct;

generating recommendations REC for introducing at least one additional component c into the industrial system SYS on the basis of the calculated scores s;

outputting the generated recommendations REC to a user by a user interface or executing the generated recommendations; and wherein the graph neural network GNN is trained to encode component features and a topology of the industrial system SYS configured by the configuration process, wherein the component features comprise static features and configurable attributes of a respective component c.

2. The computer-implemented method according to claim 1, wherein the topology of the industrial system SYS is represented by a topology graph $G=(V, E)$ stored in a memory, wherein a vertex set V of the topology graph G contains vertices v representing configured components c of the industrial system SYS and wherein an edge set E of the topology graph G contains edges between two vertices $v_i$, $v_j$ representing connections between two corresponding components $c_i$, $c_j$ within the industrial system SYS configured by the configuration process.

3. The computer-implemented method according to claim 2, wherein each vertex v within the vertex set V of the topology graph G of the industrial system SYS representing a respective corresponding component c in the industrial system SYS, comprises an associated feature vector $x_v$ specifying technical attributes of the respective corresponding component c.

4. The computer-implemented method according to claim 3, wherein each feature vector $x_v$ of a vertex v within the vertex set V of the stored topology graph G of the industrial system SYS comprises a one-hot encoding of the component type ct of the respective component c.

5. The computer-implemented method according to claim 1, wherein the feature vectors $x_v$ of all vertices v of the vertex set V of the stored topology graph G of the industrial system SYS form a feature matrix X stored in the memory.

6. The computer-implemented method according to claim 1, wherein an embedding for each configured component c of the industrial system SYS is performed by processing a respective feature vector $x_v$ of the corresponding vertex v within the vertex set V of the stored topology graph G of the industrial system SYS along with the feature vectors $x_v$ of all neighboring vertices v in the stored topology graph G, by the trained graph neural network GNN to generate a context-aware embedding $h_v$ with an embedding size d of the respective component c.

7. The computer-implemented method according to claim 1, wherein the embedding $h_v$ is performed for all of the configured components c of the industrial system SYS to generate a first embedding matrix H, with $H \in \mathbb{R}^{n \times d}$, wherein n is the number of vertices v, in the vertex set V of the stored topology graph G and d is the embedding size.

8. The computer-implemented method according to claim 1, wherein embedding is performed for all component types ct of components c to generate a second embedding matrix Z, with $Z \in \mathbb{R}^{m \times d}$, wherein m is the number of configurable component types ct and d is the embedding size.

9. The computer-implemented method according to claim 7, wherein a matrix multiplication of the second embedding matrix Z with the transposed first embedding matrix $H^T$ is performed to calculate a score matrix S with $S \in \mathbb{R}^{m \times n}$, wherein each entry $s_{ij}$ of the score matrix S contains a score s which indicates a plausibility of selecting a component c of the component type $ct_i$ and connecting it to an already configured component c of the component type $ct_j$.

10. The computer-implemented method according to claim 1, wherein recommendations for introducing at least one additional component c into the industrial system SYS are generated for the component types ct having highest scores s in the score matrix S.

11. The computer-implemented method according to claim 1, wherein in response to the introduction of the additional component, c, into the industrial system SYS by the user via the user interface, the stored topology graph G of the industrial system SYS is automatically extended with an additional vertex v corresponding to the introduced component c and extended with an edge between the additional vertex v and the vertex of the at least one component c to which the additional component c has been connected to.

12. The computer-implemented method according to claim 1, wherein a feature vector $x_v$ of the vertex v corresponding to the additional component c is initialized with a one-hot encoding of the component type ct of the additional component c and the remaining entries of a feature vector $x_v$ are set to zero.

13. The computer-implemented method according to claim 12, wherein the initialized feature vector $x_v$ of the vertex v corresponding to the additional component c is passed through the trained graph neural network GNN to produce for the respective added component c an embedding $h_{n+1}$, which is fed into a prediction model g to generate a prediction vector $\hat{x}_{n+1}$ having entries output to the user via the user interface as recommendations for technical attributes of the additional component c.

14. A recommendation engine for providing recommendations REC concerning a configuration process to configure an industrial system SYS, wherein the recommendation engine is configured to calculate scores s by a trained graph neural network GNN for components c of a set C of configurable component types ct and to generate automatically recommendations REC for introducing at least one additional component c into the industrial system SYS on the basis of the calculated scores s, wherein the generated recommendations REC are output to a user by a user interface or executed automatically by the recommendation engine, and wherein the graph neural network GNN is trained to encode component features and a topology of the industrial system SYS configured by the configuration process, wherein the component features comprise static features and configurable attributes of a respective component c.

* * * * *